(12) United States Patent
Wei et al.

(10) Patent No.: US 11,017,094 B2
(45) Date of Patent: May 25, 2021

(54) SYSTEM AND METHOD FOR JAVA DESERIALIZATION VULNERABILITY DETECTION

(71) Applicants: Beijing Jingdong Shangke Information Technology Co., Ltd., Beijing (CN); JD.com American Technologies Corporation, Mountain View, CA (US)

(72) Inventors: Fengguo Wei, Mountain View, CA (US); Yueh-Hsun Lin, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 644 days.

(21) Appl. No.: 15/861,310

(22) Filed: Jan. 3, 2018

(65) Prior Publication Data
US 2019/0205543 A1    Jul. 4, 2019

(51) Int. Cl.
*G06F 21/54* (2013.01)
*G06F 21/00* (2013.01)
(Continued)

(52) U.S. Cl.
CPC .............. *G06F 21/577* (2013.01); *G06F 8/75* (2013.01); *G06F 11/3612* (2013.01);
(Continued)

(58) Field of Classification Search
CPC ............. H04L 41/2843; H04L 1463/10; H04L 1467/02; H04L 1467/16; G06F 8/10;
(Continued)

(56) References Cited

U.S. PATENT DOCUMENTS

| | | | |
|---|---|---|---|
| 2014/0007041 A1* | 1/2014 | Schmeling | G06F 8/20 |
| | | | 717/105 |
| 2015/0309813 A1* | 10/2015 | Patel | G06F 11/3664 |
| | | | 703/22 |

OTHER PUBLICATIONS

Federico Dotta, "Reliable discovery and exploitation of Java deserialization vulnerabilities," May 2017, mediaservice.net, retrieved on Sep. 29, 2020 at "https://techblog.mediaservice.net/2017/05/reliable-discovery-and-exploitation-of-java-deserialization-vulnerabilities/" (Year: 2017).*

(Continued)

*Primary Examiner* — Christopher C Harris
*Assistant Examiner* — Kalish K Bell
(74) *Attorney, Agent, or Firm* — China Science Patent & Trademark US LLC

(57) ABSTRACT

A method for generating a deserialization vulnerability report of a Java project, includes: determining, by a computing device, if interior knowledge of the Java project is available, and when the interior knowledge of the Java project isn't available, performing a black box analysis to generate the deserialization vulnerability report; and when the interior knowledge of the Java project is available, determining by the computing device if source code of the Java project is accessible, when the source code of the Java project is accessible, performing a white box analysis to generate the deserialization vulnerability report, and when the source code of the Java project isn't accessible, performing a gray box analysis to generate the deserialization vulnerability report.

11 Claims, 14 Drawing Sheets

(51) Int. Cl.

| | |
|---|---|
| *G06F 16/00* | (2019.01) |
| *G06F 21/55* | (2013.01) |
| *G06F 8/75* | (2018.01) |
| *G06F 16/24* | (2019.01) |
| *G06F 16/95* | (2019.01) |
| *G06F 21/50* | (2013.01) |
| *G06F 21/71* | (2013.01) |
| *G06F 8/10* | (2018.01) |
| *G06F 9/46* | (2006.01) |
| *G06F 9/54* | (2006.01) |
| *G06F 21/57* | (2013.01) |
| *G06F 11/36* | (2006.01) |

(52) U.S. Cl.
CPC ...... *G06F 11/3684* (2013.01); *G06F 11/3688* (2013.01); *G06F 21/556* (2013.01); *G06F 2221/033* (2013.01)

(58) Field of Classification Search
CPC .............. G06F 759/46; G06F 5416/00; G06F 5416/24; G06F 9521/00; G06F 9521/50; G06F 9521/54; G06F 9521/55; G06F 9521/56; G06F 9521/577; G06F 9521/71
See application file for complete search history.

(56) References Cited

OTHER PUBLICATIONS

Koch et al., "Semi-automated Discovery of Server-Based Information Oversharing Vulnerabilities in Android Applications," Jul. 2017, Association for Computing Machinery, retrieved on Sep. 30, 2020 at "https://wfk.io/docs/sifon.pdf" (Year: 2017).*

Petre Popescu, "Tricking blind Java deserialization for a treat," Nov. 2017, Security Café, retrieved on Sep. 30, 2020 at "https://securitycafe.ro/2017/11/03/tricking-java-serialization-for-a-treat/" (Year: 2017).*

Charles Fol, "PHP Generic Gadget Chains: Exploiting Unserialize in Unknown Environments," Jul. 2017, Ambionics Security, retrieved on Oct. 1, 2020 at "https://www.aMbionics.io/blog/php-generic-gadget-chains" (Year: 2017).*

Unknown Author, "Linux Network Tools for Monitoring and Security Guard in Local Area Network or Internet," Dec. 2015, Arief-JR, retrieved at "https://arief-jr.blogspot.com/2015/12/linux-network-tools-for-monitoring-and.html" on Oct. 1, 2020. (Year: 2015).*

Alvaro Munoz and Oleksandr Mirosh, A Journey From JNDI/LDAP Manipulation to Remote Code Execution Dream Land, 2016, Black Hat USA 2016, Las Vegas.

Gabriel Lawrence and C Frohoff, Marshalling Pickles: how deserializing objects will ruin your day, 2015, AppSecCali, Santa Monica.

Alvaro Munoz and Christian Schneider, Surviving the Java deserialization apocalypse, 2016, OWASP AppSecEU, Tel Aviv.

Luca Carettoni, Defending against Java deserialization vulnerabilities, 2016, Bay Area OWASP Meetup.

Alvaro Munoz, The perils of Java deserialization, 2016, Hewlett Packard Enterprise Technical report.

Matthias Kaiser, Pwning your Java messaging with deserialization vulnerabilities, 2016, Black Hat USA 2016.

Or Peles and Roee Hay, One Class to rule them all: 0-Day deserialization vulnerabilities in android, 2015, 9th USENIX Workshop on Offensive Technologies, Washington, D.C.

* cited by examiner

```
1    public class Main {
2
3      public static void main (String[] args) {
4        File f = new File("/attacker/controllable/dir/data.obj");
5        FileInputStream fis = new FileInputStream(f);
6        ObjectInputStream ois = new ObjectInputStream(fis);
7        Data d = (Data) ois.readObject();
8      }
9
10   }
```

FIG. 4

```
<dependency>
  <groupId>commons-collections</groupId>
  <artifactId>commons-collections</artifactId>
  <version>3.1</version>
</dependency>
<dependency>
  <groupId>org.slf4j</groupId>
  <artifactId>slf4j-api</artifactId>
  <version>1.7.21</version>
</dependency>
```

FIG. 6

```
aced 0005 7372 0009 7465 7374 2e44 6174
61f4 a9f4 4be2 bf83 a802 0001 4c00 0763
6f6e 7465 6e74 7400 124c 6a61 7661 2f6c
616e 672f 5374 7269 6e67 3b78 7074 000a
5465 7374 2064 6174 6121
```

FIG. 8

Generated test cases:
Testcase 1 (steps):
 1. Write generated exploit byte sequence into file "/attacker/controllable/dir/data.obj".
 2. Invoke Main.main();

FIG. 10

SYSTEM AND METHOD FOR JAVA DESERIALIZATION VULNERABILITY DETECTION

CROSS-REFERENCES

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to software robustness, and more particularly to Java deserialization vulnerability detection which can be performed automatically with broad coverage.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Java® is a trademark of Sun Microsystems and now owned by Oracle Corporation. For purpose of brevity, Java® is hereinafter referred to as "Java." Java provides a mechanism called object serialization, which allows an object to be represented as a sequence of bytes. Deserialization is a reverse process. More specifically, the deserialization process takes the serialized bytes and starts a cyclic process to reconstruct class instance and retrieve its content.

Java deserialization vulnerability is a well-known issue for java programs since 2015. It allows attacker to do harmful damage, such as arbitrary Remote Code Execution (RCE) on vulnerable applications. There are already some works on this issue. However, the existing works are mostly background studies of the java deserialization vulnerability, and there is no automatic and comprehensive method to locate and process those vulnerability.

Therefore, an unaddressed need exists in the art to address the aforementioned deficiencies and inadequacies.

SUMMARY OF THE INVENTION

In certain aspects, the present invention relates to a method for generating a deserialization vulnerability report of a Java project. In certain embodiments, the method includes:

determining, by a computing device, if interior knowledge of the Java project is available, and when the interior knowledge of the Java project isn't available, performing a black box analysis to generate the deserialization vulnerability report; and when the interior knowledge of the Java project is available, determining by the computing device if source code of the Java project is accessible, when the source code of the Java project is accessible, performing a white box analysis to generate the deserialization vulnerability report, and when the source code of the Java project isn't accessible, performing a gray box analysis to generate the deserialization vulnerability report.

In certain embodiments, the white box analysis is performed by: analyzing the source code to obtain information of entry points; scanning configuration files of the Java project to generate exploit payloads; and executing the exploit payloads against the entry points to generate the deserialization vulnerability report.

In certain embodiments, the step of analyzing the source code to obtain information of the entry points comprises: collecting source information and sink information from the source code, wherein the source information comprises source entry points for accepting external data, and the sink information comprises sink points for performing deserialization; performing taint analysis on the source information and the sink information to generate taint path between the source entry points and the sink points; and parsing the taint path to extract the information of the entry points, wherein the information of the entry points comprises ways to feed data to the source entry points to intrigue the sink points.

In certain embodiments, the sink information comprises deserialization Application Programming Interface (API).

In certain embodiments, the step of scanning the configuration files of the Java project to generate the exploit payloads comprises: resolving the configuration files to obtain library files that the java program depends on; scanning the library files and the source code to obtain gadgets that match with one from a gadget pattern database (DB); and generating the exploit payloads using the obtained gadgets. In certain embodiments, the gadget pattern DB comprises gadget patterns that cause risk in deserialization, and the gadget patterns comprises at least one of file write permission, code execution permission, Java reflection information, and open socket information.

In certain embodiments, the step of executing the exploit payloads against the entry points to generate the deserialization vulnerability report comprises: determining relationship between the entry points and the exploit payloads to generate unit test cases for proof of concept (POC) test; and executing the unit test cases under corresponding environment of the Java program to generate the deserialization vulnerability report.

In certain embodiments, the gray box analysis is performed by: exploiting the Java project by forcing gadget payloads from a gadget payload database to an entry point specified in an entry point specification, and generating the deserialization vulnerability report based on the exploiting. In certain embodiments, the exploiting is performed by a fuzzer.

In certain embodiments, the black box analysis comprises: identifying a candidate Java service on a server, which is deemed as the Java project; exploiting the candidate Java service by known gadget payloads from a gadget payload database; and generating the deserialization vulnerability report based on the exploiting. In certain embodiments, the exploiting is performed by a fuzzer.

In certain embodiments, the step of identifying the candidate Java service comprises: scanning the server for open ports and service information; and identifying a Java service running on one of the ports as the candidate Java service.

In certain embodiments, the method further comprising accumulating the generated exploit payloads in a gadget payload DB.

In certain aspects, the present invention relates to a method for generating a deserialization vulnerability report of a Java program. In certain embodiments, the method includes:

resolving, by a computing device, a configuration file of a Java program to find a set of library jar files on which the Java program is dependent on;

searching, by a computing device, the set of library jar files and the Java program for a pattern which possibly causes risks in deserialization;

generating, by a computing device, an exploit payload based on the searched pattern; and exploiting, by a computing device, the Java program based on the exploit payload.

In certain embodiments, the searching is performed based on a gadget pattern database (DB) storing gadget patterns. In certain embodiments, the gadget patterns comprise one or more of Runtime.exe( ), file write, Java reflection, or open socket.

In certain embodiments, the step of exploiting the Java program based on the exploit payload comprises: generating a Proof of Concept (POC) test case which involves inputting the exploit payload to the entry point; and evaluating the POC test case on the Java project.

In certain embodiments, the method further includes accumulating the generated exploit payload, which is identified as a gadget as a result of the exploiting, in a gadget payload DB.

In certain aspects, the present invention relates to a computing device. In certain embodiments, the computing device includes a processor and a storage device storing computer executable code. The computer executable code, when executed at the processor, is configured to:

perform static analysis on a Java program by analyzing source codes of the Java program to find an entry point to a possibly vulnerable path from a data source to a data sink of the Java program;

generate exploit payload based on a possible gadget pattern existing in a set of library jar files on which the Java program is dependent on and also the Java program; and perform dynamic analysis on the Java program by exploiting the Java program based on the generated exploit payload and the entry point.

In certain embodiments, the computer executable code, when executed at the processor, is configured to find the entry point based on data flow analysis and taint analysis and resolve a configuration file of the Java program to derive the set of library jar files.

In certain embodiments, the computer executable code, when executed at the processor, is configured to perform dynamic analysis by: generating a Proof of Concept (POC) test case which involves inputting the exploit payload to the entry point; and evaluating the POC test case on the Java project.

In certain aspects, the present invention relates to a non-transitory computer readable medium storing computer executable code. The computer executable code, when executed at a processor of a computing device, is configured to perform the method described above.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The present invention will become more fully understood from the detailed description and the accompanying drawings. These accompanying drawings illustrate one or more embodiments of the present invention and, together with the written description, serve to explain the principles of the present invention. Wherever possible, the same reference numbers are used throughout the drawings to refer to the same or like elements of an embodiment, and wherein:

FIG. 4 schematically depicts an example of a Java source file.

FIG. 6 schematically depicts an example of a configuration file.

FIG. 8 schematically depicts an example of an exploit payload.

FIG. 10 schematically depicts an example test case.

DETAILED DESCRIPTION OF THE INVENTION

Figure 1:
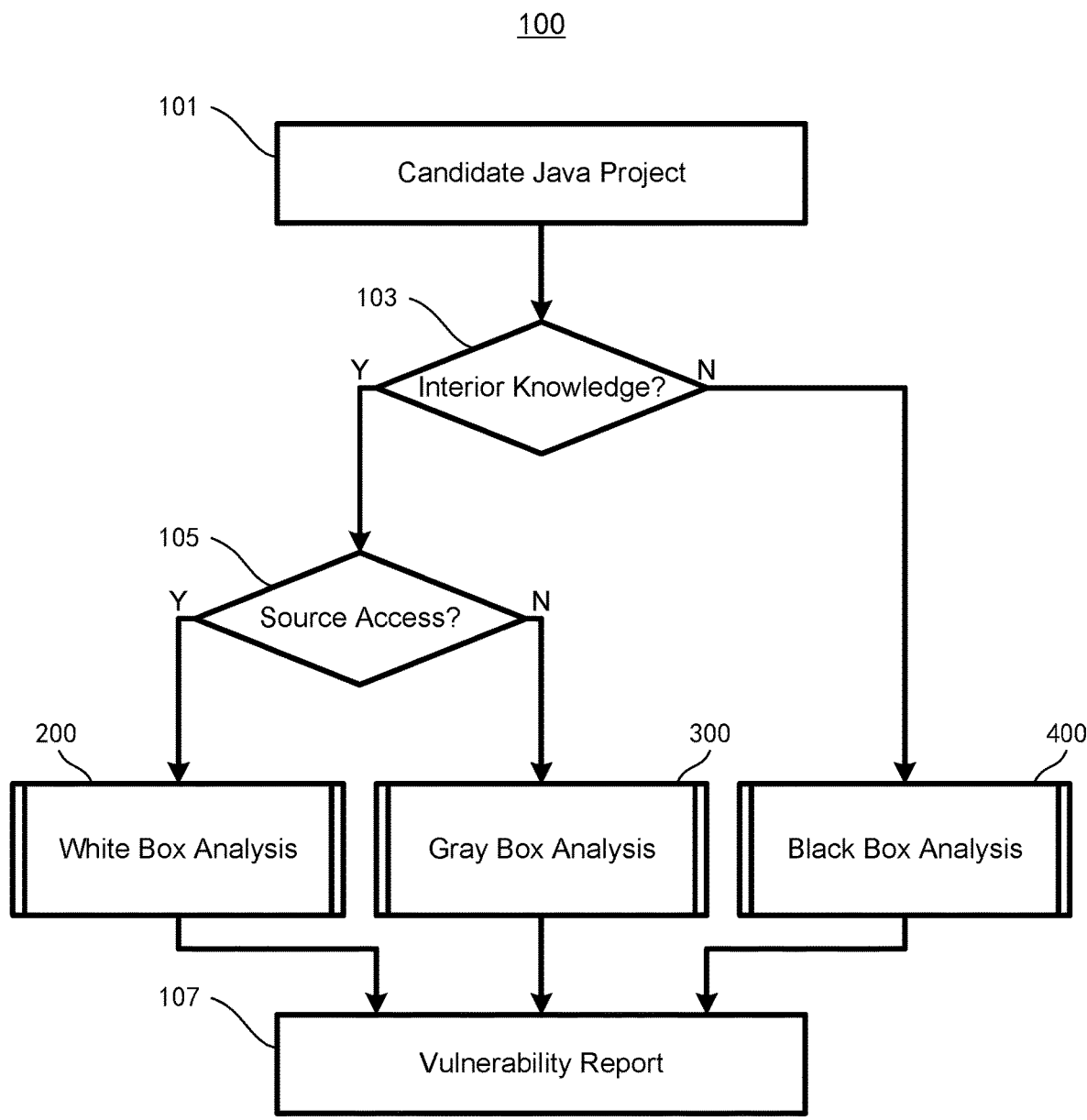
FIG. 1 schematically depicts an overview of a Java vulnerability detection method according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In one aspect, the present invention is directed to automatic Java deserialization vulnerability detection. In certain embodiments, a hybrid approach combining static analysis and dynamic analysis can be applied. According to the embodiments, the Java deserialization vulnerability can be found in a thorough and automatic manner.

FIG. 1 schematically depicts an overview of a Java vulnerability detection method according to certain embodiments of the present invention. The detection method may be accomplished by a computing device shown in FIG. 13.

As shown in FIG. 1, the method 100 receives a candidate Java project as an input at 101. The candidate Java project may include, for example, a Java program developed by a user of the method 100, a Java package from a third-party developer, or a Java service provided by a service provider. The candidate Java project may be stored in a local storage such as Hard Disk Drive (HDD), recorded in a readable medium such as Compact Disk (CD) or Digital Versatile Disk (DVD), or distributed over network, either wired or wireless, such as Internet. The candidate Java project may have serialization process and deserialization process, and thus may have deserialization vulnerability.

According to certain embodiments, the candidate Java project may be analyzed according to different strategies or in different ways based on whether its source codes are accessible or not and whether there is interior knowledge about the Java project or not.

More specifically, as shown in FIG. 1, if we have both the interior knowledge about the Java project, for example, some specification(s) about the Java project including an entry point specification as described below, and also access to its source codes, for example, .java files and/or .jar files of the Java project ("Y" at 103 and "Y" at 105), we can conduct a white box analysis on the Java project at 200. Or otherwise, if we have only the interior knowledge, but without the access to the source codes ("Y" at 103 and "N" at 105), we can conduct a gray box analysis on the Java project at 300. Or otherwise, if we have neither the interior knowledge nor the access to the source codes ("N" at 103 and "N" at 105), we can conduct a black box analysis on the Java project at 400. From any one or more of those analyses, a vulnerability report on the candidate Java project can be derived at 107. All those analyses and the generation of the vulnerability report can be conducted in an automatic manner, without manual intervention of the user.

Here, it is to be noted that the interior knowledge may be derived from the source codes. Therefore, if we have the access to the source codes, then we have the interior knowledge.

Hereinafter, the different types of analyses will be described in more detail.

According to certain embodiments, a comprehensive analysis will be applied to the candidate Java project if there is enough information on the project. Such a comprehensive analysis is referred to as the "white box analysis" here. In the white box analysis, a hybrid approach including both static analysis and dynamic analysis may be adopted. The static analysis is based on the source codes of the Java project. For example, the source codes may be scanned for possible vulnerable program points therein. The dynamic analysis is based on running of the Java project, and facilitates removing false positives from the found possible vulnerable program points. As a result, the hybrid approach is advantageous in terms of coverage (due to at least the wide-range scan by the static analysis) and accuracy (due to at least the false-positive removal by the dynamic analysis).

Figure 2:
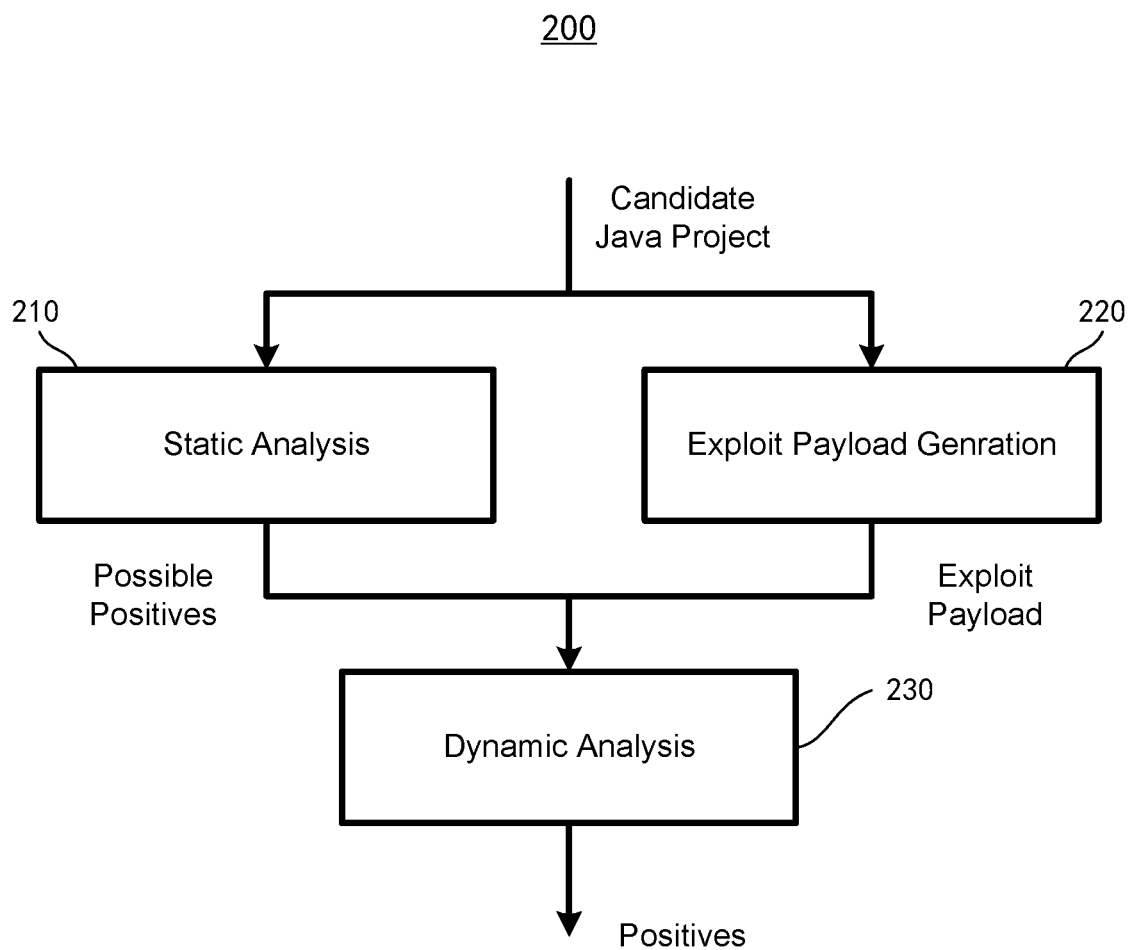
FIG. 2 schematically depicts a hybrid approach according to certain embodiments of the present invention.

FIG. 2 schematically depicts a hybrid approach according to certain embodiments of the present invention.

As shown in FIG. 2, the approach 200 has the candidate Java project as an input. More specifically, the source codes of the Java project, such as .java files and/or .jar files, may be inputted to the approach 200.

The codes may be subjected to the static analysis at 210. In the context of deserialization vulnerability, risks may consist in fake data and/or malicious codes from attackers. Such fake data and/or malicious codes may be introduced from a data source, and then flow along a data path from the data source to a data sink and result in unwanted effects. Such a data path may be called a "vulnerable path." The static analysis may be conducted by analyzing the source codes to find at least some or even all vulnerable paths throughout the source codes. For example, the source codes may be parsed to find various data sources and sinks and thus paths between the sources and sinks, from among which possibly vulnerable paths may be identified. The static analysis may be conducted by, for example, data flow analysis. As a result, (all) the possibly vulnerable paths existing in the Java project and also their respective entry points (or the associated data sources) are identified.

Then, the Java project may be exploited to determine whether all those possibly vulnerable paths are really vulnerable. To exploit the Java project, some exploit payload may be generated at 220. In the context of deserialization vulnerability, the payload may be generated based on gadgets. "Gadget" means that the deserialization procedure can be abused to allow attackers to perform malicious functions, like, arbitrary code execution, file read/write, socket operation, etc. For example, a set of Java libraries on which the Java project is dependent upon, which may be identified from the source codes, and also the Java project may be scanned for possible gadget patterns existing therein. Here, the gadget patterns mean patterns which might cause gadget or malicious operations, such as file read/write, code execution, socket operation or the like. For example, the gadget patterns may include Runtime.exec( ), File Write, Java reflection, Open socket, or the like. Then, the exploit payload may be generated based on the found gadget patterns.

The Java project may be subjected to the dynamic analysis at 230. For example, the Java project, or at least a portion thereof, for example, one relating to the possibly vulnerable paths, may be compiled into an executable form, and then executed by a computing device, such as a general purpose computer with the codes loaded into its memory. The project, when running, may be exploited based on the exploit payload and the entry points. For example, the payload may be injected into the possibly vulnerable paths from their respective entry points, and then it is evaluated whether the attack successes or not. If the attack successes in one of the paths, then this path may be identified as a "vulnerable path" (or "positive"); or otherwise, if the attack fails, then this path may be identified as a "non-vulnerable path" (or "negative"). As a result of the dynamic analysis, a collection of the vulnerable paths and also their respective entry points are identified. Based on this collection of the vulnerable paths and the entry points, a vulnerability report may be generated.

Figure 3:
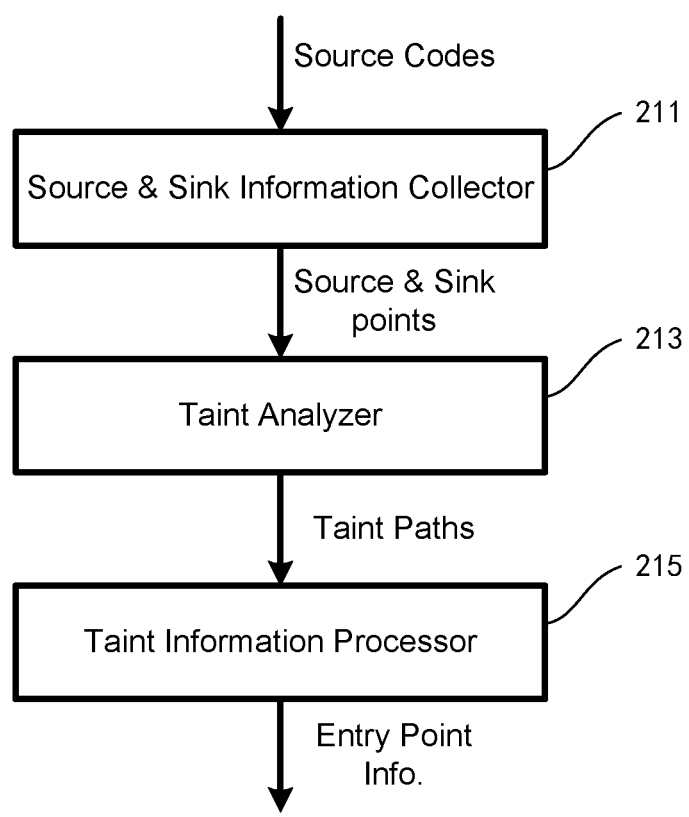
FIG. 3 schematically depicts a static analyzer according to certain embodiments of the present invention.

FIG. 3 schematically depicts an example of a static analyzer according to certain embodiments of the present invention.

As shown in FIG. 3, the static analyzer 210 includes a source and sink information collector 211, a taint analyzer 213, and a taint information processor 215.

The source and sink information collector 211 is configured to extract data sources and sinks based on the source codes, the .java files and/or the .jar files, of the Java project. In the context of deserialization vulnerability, the data sources may refer to untrusted data entry points, and the data sinks may refer to Java deserialization APIs. FIG. 4 schematically depicts an example of a Java source file, Main.java. As shown in FIG. 4, the file has an entry point as indicated in Line 4, which will be identified as a data source, and also a deserialization point as indicated in Line 7, which will be identified as a data sink.

The data sources and sinks (and also the source codes) may be fed into the taint analyzer 213. The taint analyzer 213 is configured to find possibly vulnerable paths or "taint" paths between the data sources and the data sinks by, for example, taint analysis. A taint path may extend from an untrusted source point to a deserialization point. There are various ways to design the taint analyzer. For example, some existing static analysis framework such as Argus-SAF can be used. In the example shown in FIG. 4, we can find a taint path of: File("/attacker/controllable/dir/data.obj") @ Line 4 (source)→f @ Line 4→FileInputStream(f) @ Line 5→fis @ Line 5→ObjectInputStream(fis) @ Line 6→ois @ Line 6→ois.readObject( ) @ Line 7 (sink).

The taint information processor 215 is configured to parse the taint paths to extract entry point information about how to feed data to trigger the data sinks. For example, the entry point information may include a list of entry points, or data sources, to the respective taint paths. In the example shown in FIG. 4, we can find an entry point of File("/attacker/controllable/dir/data.obj") @ Line 4.

Figure 5:
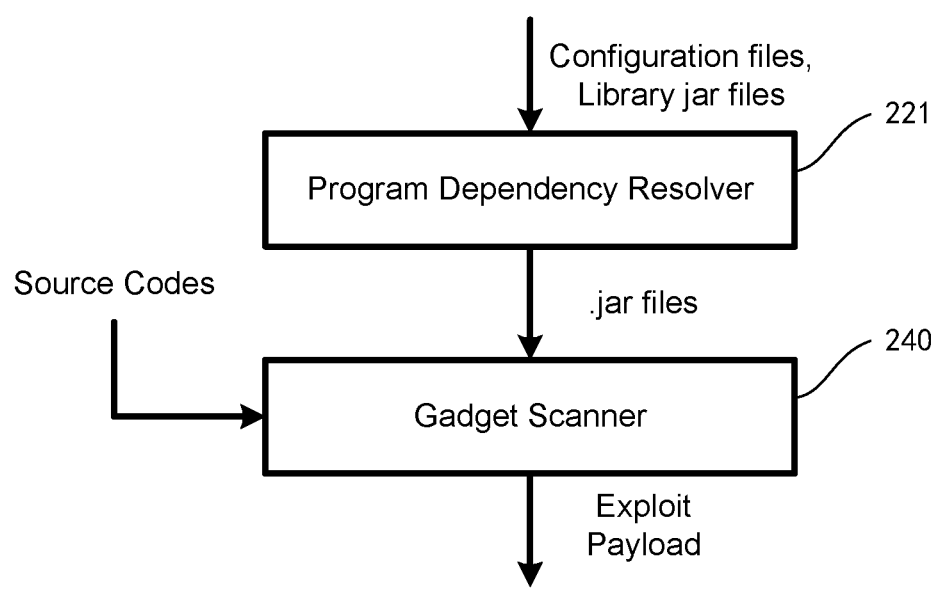
FIG. 5 schematically depicts an example of an exploit payload generator engine according to certain embodiments of the present invention.

FIG. 5 schematically depicts an example of an exploit payload generator engine according to certain embodiments of the present invention.

As shown in FIG. 5, the exploit payload generator engine 220 includes a program dependency revolver 221 and a gadget scanner 240.

The program dependency revolver 221 takes the source codes, especially a configuration file for the Java project, as an input. The configuration file may include dependencies of the Java project on some libraries. The program dependency revolver 221 is configured to resolve the configuration file to find a set of library jar files on which the Java project is dependent on. For example, the configuration file may be in a format of pom.xml, *.sbt, or *.gradle. Accordingly the program dependency revolver 221 may include one or more of a Maven resolver for the configuration file in the format of pom.txt, a SBT resolver for the configuration file in the format of *.sbt, or a Gradle resolver for the configuration file in the format of *.gradle. FIG. 6 schematically depicts an example of a configuration file in the format of pom.xml. From the example configuration file, we can find library jar files of: commons-collections3.1.jar, and slf4j-api1.7.21.jar.

The gadget scanner 240 is configured to scan the set of the library jar files and also the source codes of the Java project (for example, the program jar files of the Java project) to find if there is any gadget therein, and generate exploit payload if there is some gadget. The generated payload may be used for the dynamic analysis, as described above.

Figure 7:
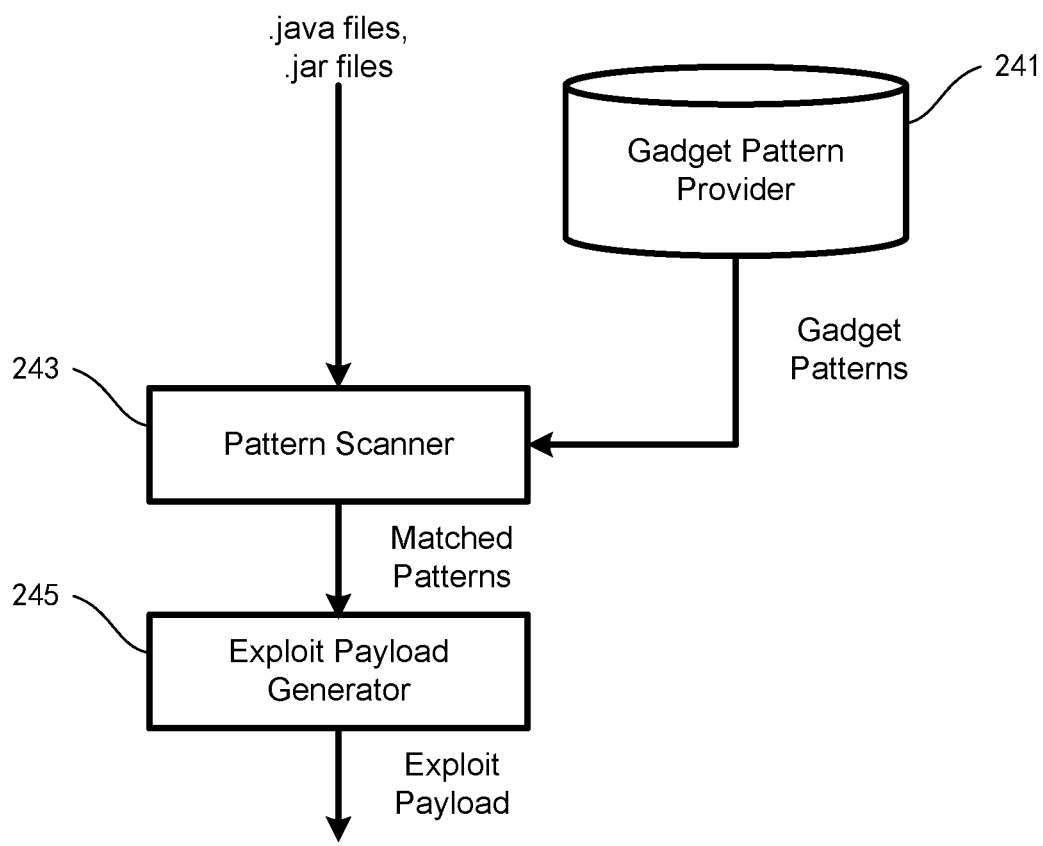
FIG. 7 schematically depicts an example of a gadget scanner according to certain embodiments of the present invention.

FIG. 7 schematically depicts an example of the gadget scanner according to certain embodiments of the present invention.

As shown in FIG. 7, the gadget scanner 240 includes a pattern scanner 243 and an exploit payload generator 245.

The pattern scanner 243 is configured to scan the Java project, including its program jar files and also the library jar files on which the Java project is dependent, for possible gadget patterns. The scanning may be performed based on known gadget patterns from a gadget pattern provider 241. The gadget pattern provider 241 may be in a form of a database (DB) which stores (all) known gadget patterns. As described above, the gadget patterns may include Runtime.exec( ), File Write, Java reflection, Open socket, or the like. The pattern scanner 243 may be configured to find some pattern(s) matching one(s) from the gadget pattern provider 241. In the example shown in FIG. 6, assume that the jar file, commons-collections3.1.jar, is of a type of Java reflection, and involves classes of, for example, ChainedTransformer, ConstantTransformer, and Invoker Transformer. It will be identified as a matched pattern.

The exploit payload generator 245 is configured to generate an exploit payload based on the matched pattern. For example, according to the matched pattern, the involved gadget classes can be identified. The payload generator 245 then constructs the exploit payload based on the matched classes. In the example shown in FIG. 6, the matched pattern existing in the commons-collections3.1.jar file indicates the type of Java reflection and the involved classes of ChainedTransformer, ConstantTransformer, and Invoker Transformer. In this case, an exploit payload may be generated as shown in FIG. 8. The generated payload may be used for the dynamic analysis, which is achieved by, for example, a Proof of Concept (POC) generator.

Figure 9:
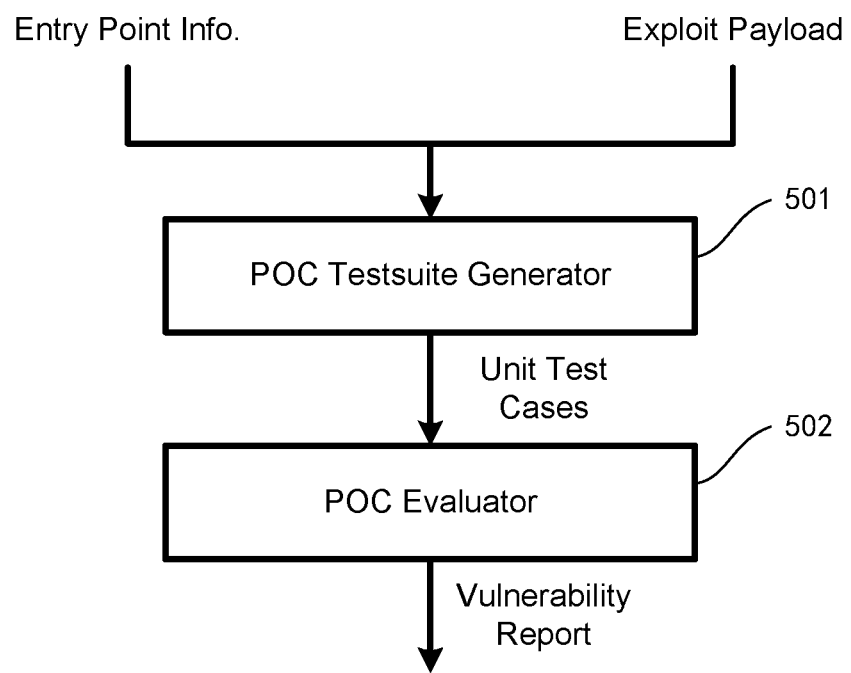
FIG. 9 schematically depicts an example of a Proof of Concept (POC) generator according to certain embodiments of the present invention.

FIG. 9 schematically depicts an example of a POC generator according to certain embodiments of the present invention.

As shown in FIG. 9, the POC generator 500 includes a POC testsuite generator 501 and a POC evaluator 503.

The POC testsuite generator 501 is configured to generate a unit test case about a POC attack based on the entry point information and the generated exploit payload. FIG. 10 schematically depicts an example test case. The shown test case involves writing the generated payload into the entry point (File("/attacker/controllable/dir/data.obj")) identified as described above and then invoking or running the Java program.

The POC evaluator 503 is configured to evaluate the unit test case on the Java project and generate the vulnerability report based on the evaluation. For example, the vulnerability report may information about the vulnerability, including position (or, entry point) of the vulnerability and relevant garget(s).

According to certain embodiments, the deserialization vulnerability analysis can be performed on a Java project if we have a limited range of knowledge about the Java project, for example, some interior knowledge about it, but without access to its source codes. The analysis is called "a gray box analysis." For example, we may purchase a Java project from its developer, and are willing to do some further development on the Java project. The developer should give specifications about the Java project to indicate details of the project. Such specifications may include an entry point specification indicating data entry points. Alternatively, the data entry points may be derived by analyzing the program, for example, its binary codes. Then, the Java project may be exploited by forcing known gadget payloads to the entry points, either indicated in the entry point specification or derived by program analysis. The vulnerability report may be generated based on the result of the exploiting.

Figure 11:
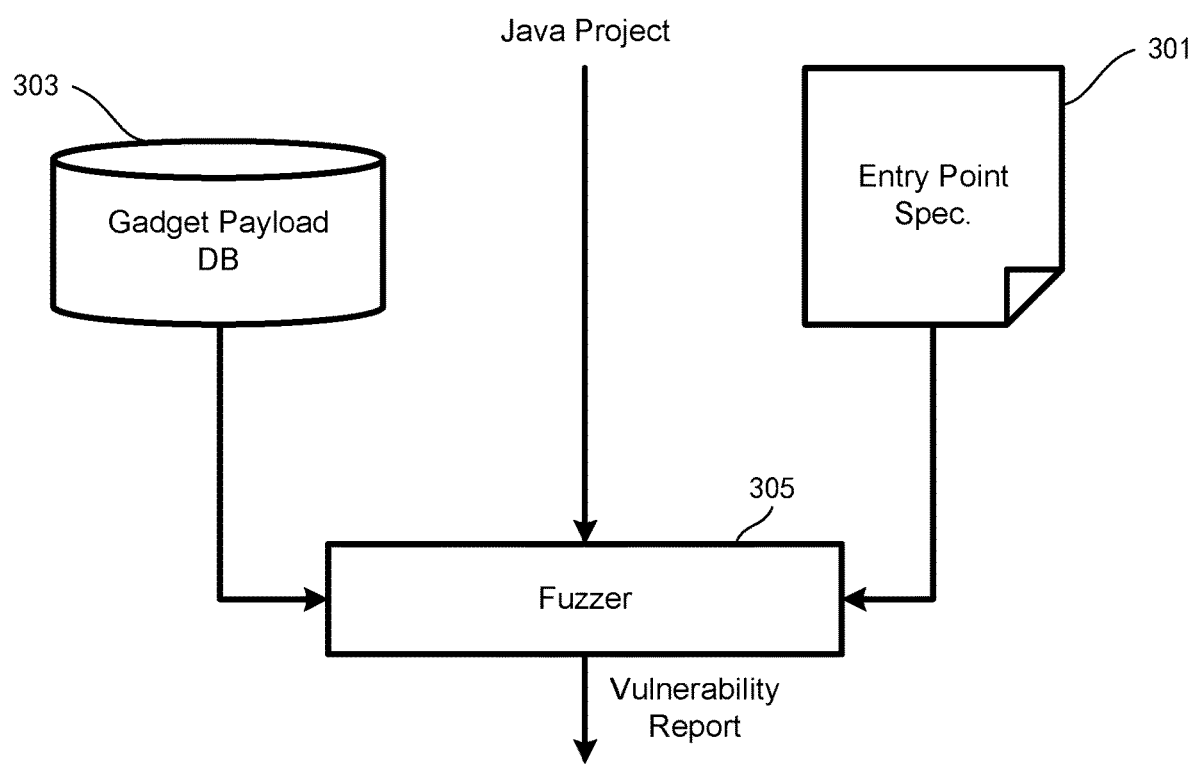
FIG. 11 schematically depicts a gray box analysis engine according to certain embodiments of the present invention.

FIG. 11 schematically depicts a gray box analysis engine according to certain embodiments of the present invention.

As shown in FIG. 11, the gray box analysis engine includes a fuzzer 305. The fuzzer 305 is configured to perform fuzzing test on the Java project based on the entry points indicated in an entry point specification 301 and known gadget payloads from a gadget payload DB 303. For example, the gadget payloads may be inputted into the entry points. The gadget payload DB 303 accumulates (all) known gadget payloads, even including the generated payloads, which is evaluated as being gargets, as described above.

According to certain embodiments, the deserialization vulnerability analysis may be conducted even if there is no specific knowledge about a Java project. Because there is no specific knowledge about the Java project, the analysis can be called "a black box analysis." For example, we know a server, for example, its IP address, which possibly hosts a Java (web) service, but without any knowledge about the service. The Java service may be identified, and then evaluated by exploiting it based on known gadget payloads. The vulnerability report may be generated based on the result of the exploiting.

Figure 12:
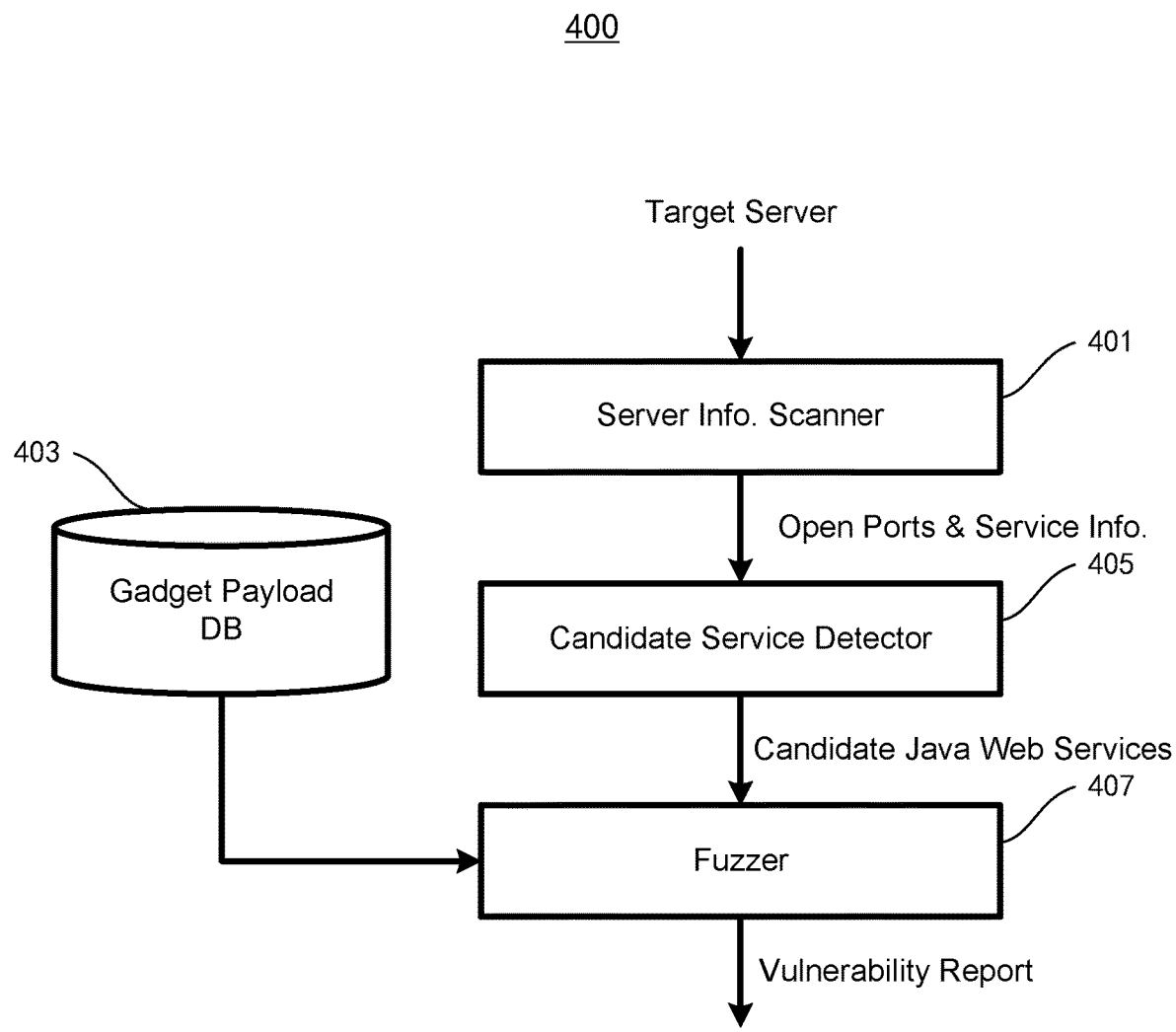
FIG. 12 schematically depicts a black box analysis engine according to certain embodiments of the present invention.

FIG. 12 schematically depicts a black box analysis engine according to certain embodiments of the present invention.

As shown in FIG. 12, the black box analysis engine 400 includes a server information scanner 401, a candidate service detector 405, and a fuzzer 407. The server information scanner 401 is configured to scan open ports and service information on a target server. The candidate service detector 405 is configured to identify which one of the scanned open ports is running Java (web) service and mark it as a candidate. The fuzzer 407 is configured to perform fuzzing test on the candidate Java (web) service based on known gadget payloads from a gadget payload DB 403. The gadget payload DB 403 accumulates (all) known gadget payloads, even including the generated payloads, which is evaluated as being gargets, as described above.

Figure 13:
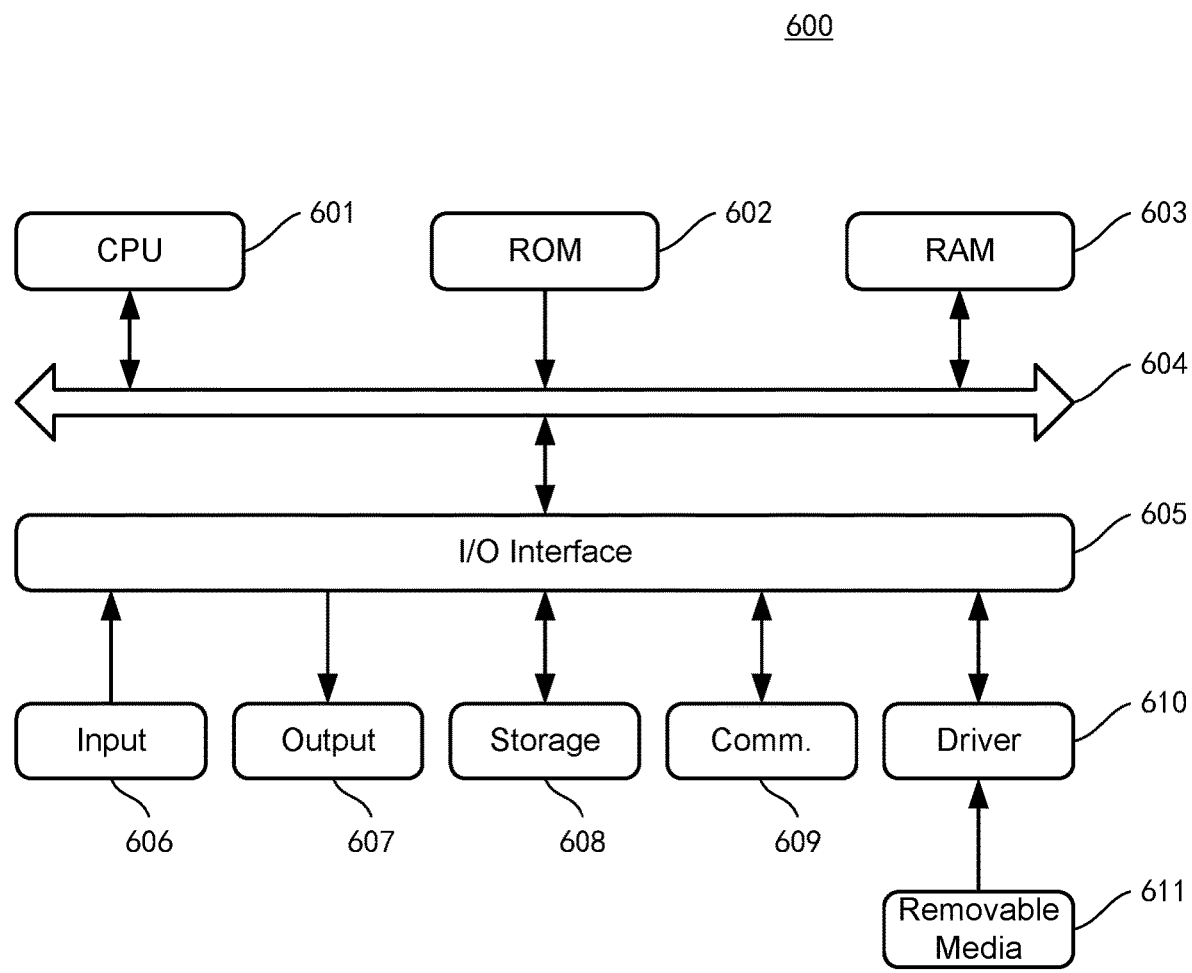
FIG. 13 schematically depicts a computing device according to certain embodiments of the present invention.

FIG. 13 schematically depicts a computing device according to certain embodiments of the present invention.

As shown in FIG. 13, the computing device 600 includes a Central Processing Unit (CPU) 601. The CPU 601 is configured to perform various actions and processes according to programs stored in a Read Only Memory (ROM) 602 or loaded into a Random-Access Memory (RAM) 603 from storage 608. The RAM 603 has various programs and data necessary for operations of the computing device 600. The CPU 601, the ROM 602, and the RAM 603 are interconnected with each other via a bus 604. Further, an I/O interface 605 is connected to the bus 604.

In certain embodiments, the computing device 600 further includes at least one or more of an input device 606 such as keyboard or mouse, an output device 607 such as Liquid Crystal Display (LCD), Light Emitting Diode (LED), Organic Light Emitting Diode (OLED) or speaker, the storage 608 such as Hard Disk Drive (HDD), and a communication interface 609 such as LAN card or modem, connected to the I/O interface 605. The communication interface 609 performs communication through a network such as Internet. In certain embodiments, a driver 610 is also connected to the I/O interface 605. A removable media 611, such as HDD, optical disk or semiconductor memory, may be mounted on the driver 610, so that programs stored thereon can be installed into the storage 608.

In certain embodiments, the process flow described herein may be implemented in software. Such software may be downloaded from the network via the communication interface 609 or read from the removable media 611, and then installed in the computing device. The computing device 600 will execute the process flow when running the software.

In a further aspect, the present invention is related to a non-transitory computer readable medium storing computer executable code. The code, when executed at one or more processer of the system, may perform the method as described above. In certain embodiments, the non-transitory computer readable medium may include, but not limited to, any physical or virtual storage media.

Figure 14:
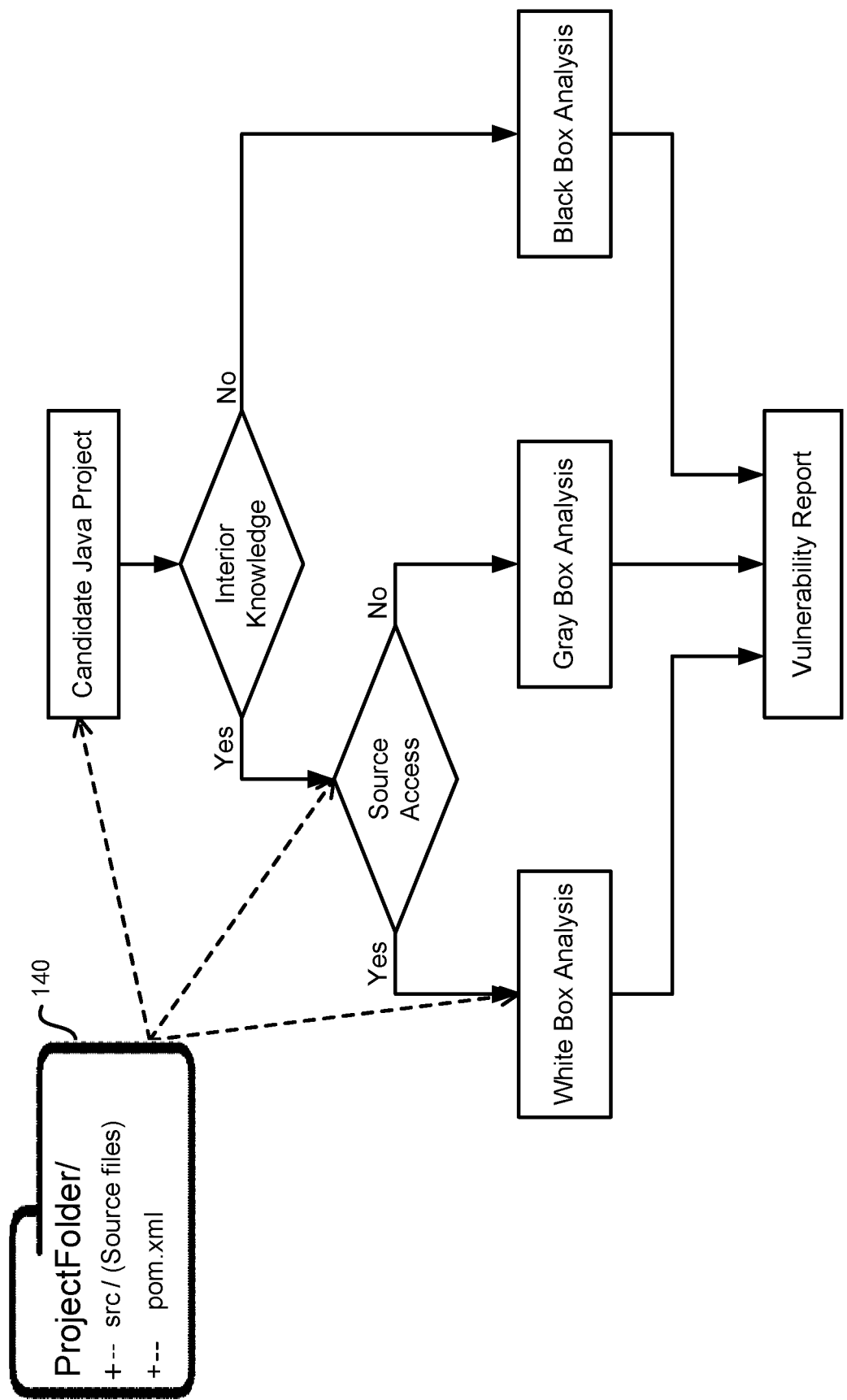
FIGS. 14-16 schematically depict a procedure of processing a Java project to generate a vulnerability report according to certain embodiments of the present invention, where interior knowledge and source code of the Java project are available.
Figure 15:
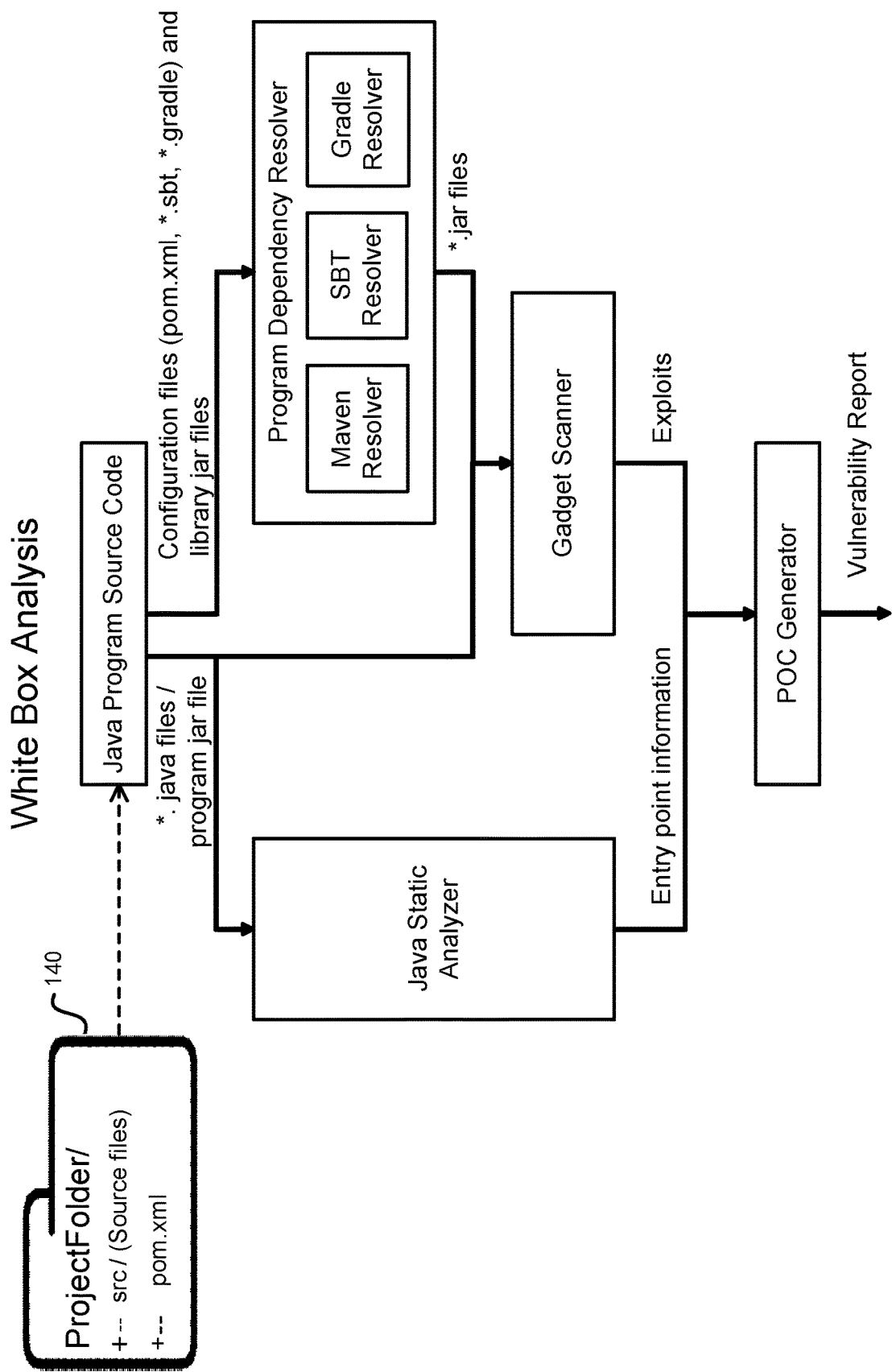
Figure 16:
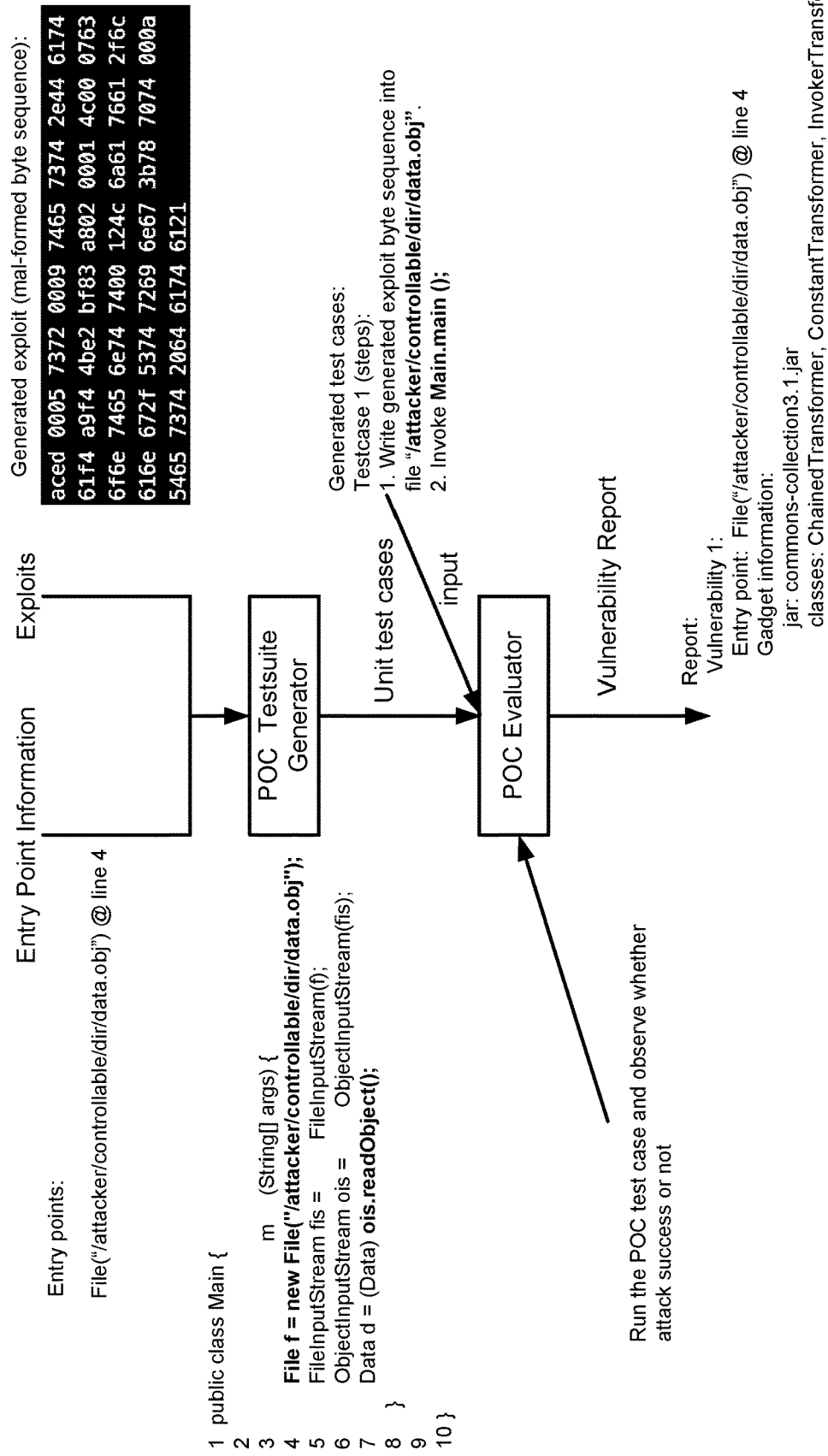

FIGS. 14-16 schematically depict an example procedure of processing a Java project to generate a vulnerability report according to certain embodiments of the present invention, where interior knowledge and source code of the Java project are available.

FIG. 14 is an overall structure of the procedure for processing the Java project. As shown in FIG. 14, a Java project 140 is inputted as the candidate Java project, the Java project 140 includes source files and configuration files. When the procedure analyzes or reads the Java project and determines that the Java project 140 includes interior knowledge, the Java project 140 is further determined to have source access or not. When the procedure determines that the source code of the Java project 140 is accessible, the Java project 140 is used as input to perform white box analysis.

FIG. 15 is the performing of the white box analysis. As shown in FIG. 15, the Java project 140 is used as input of the Java program source code. The input includes *.Java files/program jar file; configuration files of the format of pom.xml, or *.sbt, or *.gradle; and library jar files. The src/(source files) is used as input of the Java static analyzer as shown in FIG. 3, and the configuration files are used as input of the program dependency resolver.

Referring back to FIG. 3 and FIG. 4, the source code is used as input of the Java static analyzer, and an entry point of is generated by the taint information processor.

As shown in FIG. 15 and referring back to FIGS. 5-7, in one example, a pom.xml file as shown in FIG. 6 is used as input for program dependency resolver, such as a Maven resolver. The Maven resolver collects information from the pom.xml file to generate jar files, such as commons-collections3.1.jar, and slf4j-api1.7.21.jar. Using the jar file and the src/(source files) as inputs, the gadget scanner generates an exploit payload. An example of the generated exploit may be the one as shown in FIG. 8.

As shown in FIG. 16 and referring to FIG. 9, using the entry point information and the generated exploit payload, the POC generator generates a unit test case about a POC attack. Then the POC evaluator runs the POC test case and provides a vulnerability report.

In summary, certain embodiments of the present invention, among other things, have the following beneficial advantages.

First, the method provides a comprehensive and automatic detection system.

Second, based on the accessibility of the interior knowledge and the source code of a Java project, the method respectively uses white box analysis, gray box analysis, and black box analysis to generate a vulnerability report. Therefore, the method not only provides an automatic and fast way to evaluate the deserialization risk, but also handles a variety of situations of Java project targets.

Third, the method provides highly accurate detection using a hybrid analysis, which leverages coverage of static analysis and dynamic analysis. In the static analysis, multiple entry points information and multiple exploit payloads are cross-checked to test the risk of the combination of each entry point and each exploit payload. In the dynamic analysis, the method exploits the multiple payload against the entry points under the environment of the Java project. The combination of the static and dynamic analysis makes the generated vulnerability report comprehensive and accurate. In addition, the method provides an expandable gadget database for generating the exploit payloads. The gadget database is able to accommodate not only any newly found patterns of gadget, but also user specific Java program configuration, which makes the analysis complete and user friendly.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES

1. A. Munoz and O. Mirosh, "A Journey From JNDI/LDAP Manipulation To Remote Code Execution Dream Land," in *Black Hat*, Las Vegas, 2016.
2. G. Lawrence and C. Frohoff, "Marshalling Pickles," in *AppSecCali*, Santa Monica, 2015.
3. A. Munoz and C. Schneider, "Surviving the Java Deserialization Apocalypse," in *OWASP AppSecEU*, Tel Aviv, 2016.
4. L. Carettoni, "Defending against Java Deserialization Vulnerabilities," 2016.
5. A. Munoz, "The perils of Java deserialization," Hewlett Packard Enterprise, 2016.
6. M. Kaiser, "Pwning Your Java Messaging With Deserialization Vulnerabilities," Code White, 2016.

7. O. Peles and R. Hat, "One Class to Rule Them All: 0-Day Deserialization Vulnerabilities in Android," in *9th USENIX Workshop on Offensive Technologies*, Washington, D.C., 2015.
8. ysoserial. [Online]. Available: https://github.com/frohoff/ysoserial.
9. marshalsec. [Online]. Available: https://github.com/mbechler/marshalsec.
10. inspector-gadget. [Online]. Available: https://github.com/frohoff/inspector-gadget.
11. Argus-SAF. [Online]. Available: https://github.com/arguslab/Argus-SAF.
12. soot. [Online]. Available: https://github.com/Sable/soot.
13. nmap. [Online]. Available: https://nmap.org/.

What is claimed is:

1. A method for generating a deserialization vulnerability report of a Java project, comprising:
    determining, by a computing device, if interior knowledge of the Java project is available, and when the interior knowledge of the Java project isn't available, performing a black box analysis to generate the deserialization vulnerability report; and
    when the interior knowledge of the Java project is available, determining by the computing device if source code of the Java project is accessible, when the source code of the Java project is accessible, performing a white box analysis to generate the deserialization vulnerability report, and when the source code of the Java project isn't accessible, performing a gray box analysis to generate the deserialization vulnerability report,
    wherein the white box analysis is performed by:
        analyzing the source code to obtain information of entry points;
        scanning configuration files of the Java project to generate exploit payloads; and
        executing the exploit payloads against the entry points to generate the deserialization vulnerability report; and
    wherein the step of scanning the configuration files of the Java project to generate the exploit payloads comprises:
        resolving the configuration files to obtain library files that the java program depends on;
        scanning the library files and the source code to obtain gadgets that match with one from a gadget pattern database (DB); and
        generating the exploit payloads using the obtained gadgets.

2. The method of claim 1, wherein the step of analyzing the source code to obtain information of the entry points comprises:
    collecting source information and sink information from the source code, wherein the source information comprises source entry points for accepting external data, and the sink information comprises sink points for performing deserialization;
    performing taint analysis on the source information and the sink information to generate taint path between the source entry points and the sink points; and
    parsing the taint path to extract the information of the entry points, wherein the information of the entry points comprises ways to feed data to the source entry points to intrigue the sink points.

3. The method of claim 2, wherein the sink information comprises deserialization Application Programming Interface (API).

4. The method of claim 1, wherein the gadget pattern DB comprises gadget patterns that cause risk in deserialization, and the gadget patterns comprises at least one of file write permission, code execution permission, Java reflection information, and open socket information.

5. The method of claim 1, wherein the step of executing the exploit payloads against the entry points to generate the deserialization vulnerability report comprises:
    determining relationship between the entry points and the exploit payloads to generate unit test cases for proof of concept (POC) test; and
    executing the unit test cases under corresponding environment of the Java program to generate the deserialization vulnerability report.

6. The method of claim 1, wherein the gray box analysis is performed by:
    exploiting the Java project by forcing gadget payloads from a gadget payload database to an entry point specified in an entry point specification, and generating the deserialization vulnerability report based on the exploiting.

7. The method of claim 6, wherein the exploiting is performed by a fuzzer.

8. The method of claim 1, wherein the black box analysis comprises:
    identifying a candidate Java service on a server, which is deemed as the Java project;
    exploiting the candidate Java service by known gadget payloads from a gadget payload database; and
    generating the deserialization vulnerability report based on the exploiting.

9. The method of claim 8, wherein the exploiting is performed by a fuzzer.

10. The method of claim 8, wherein the step of identifying the candidate Java service comprises:
    scanning the server for open ports and service information; and
    identifying a Java service running on one of the ports as the candidate Java service.

11. The method of claim 1, further comprising accumulating the generated exploit payloads in a gadget payload DB.

* * * * *